UNITED STATES PATENT OFFICE.

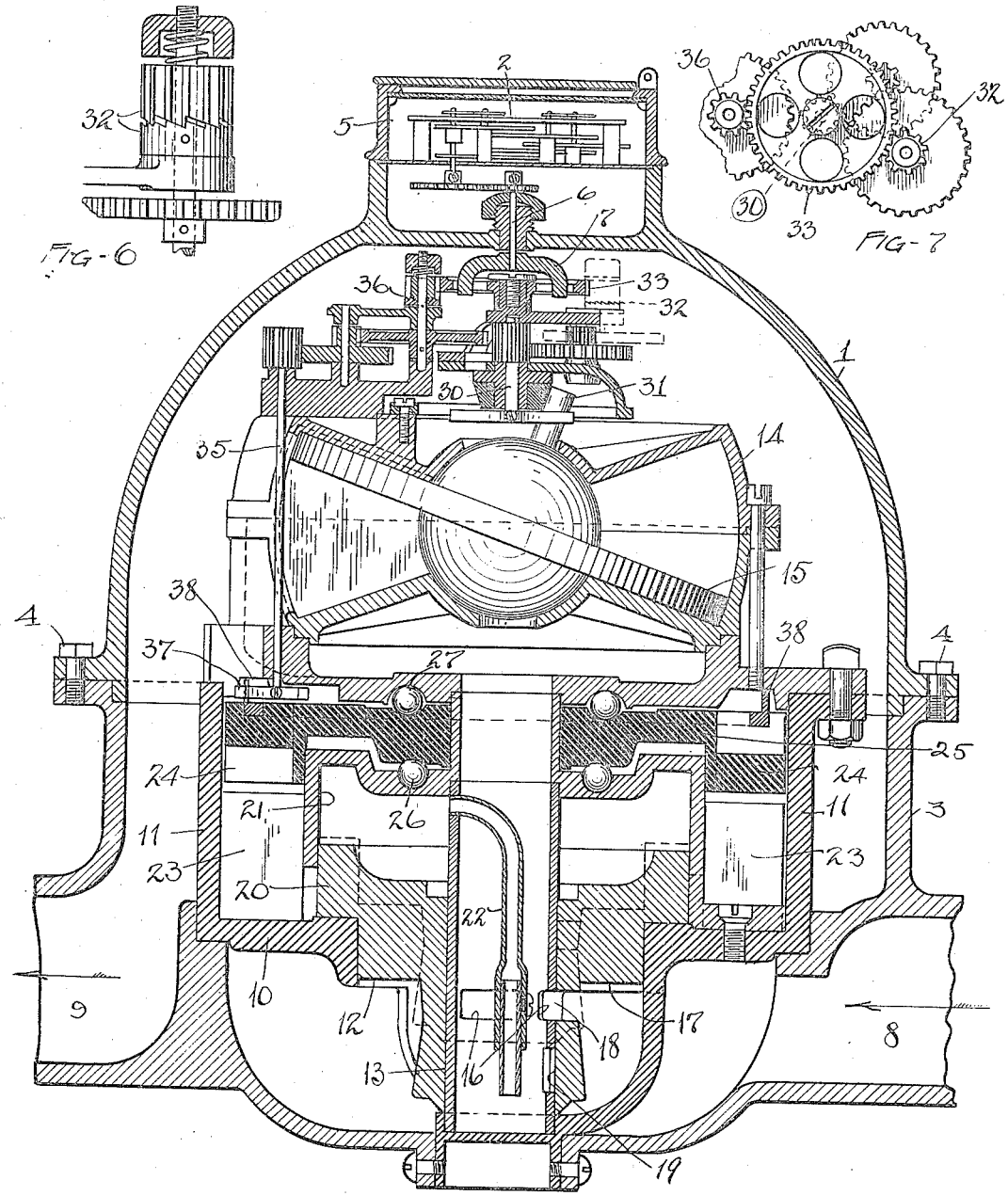

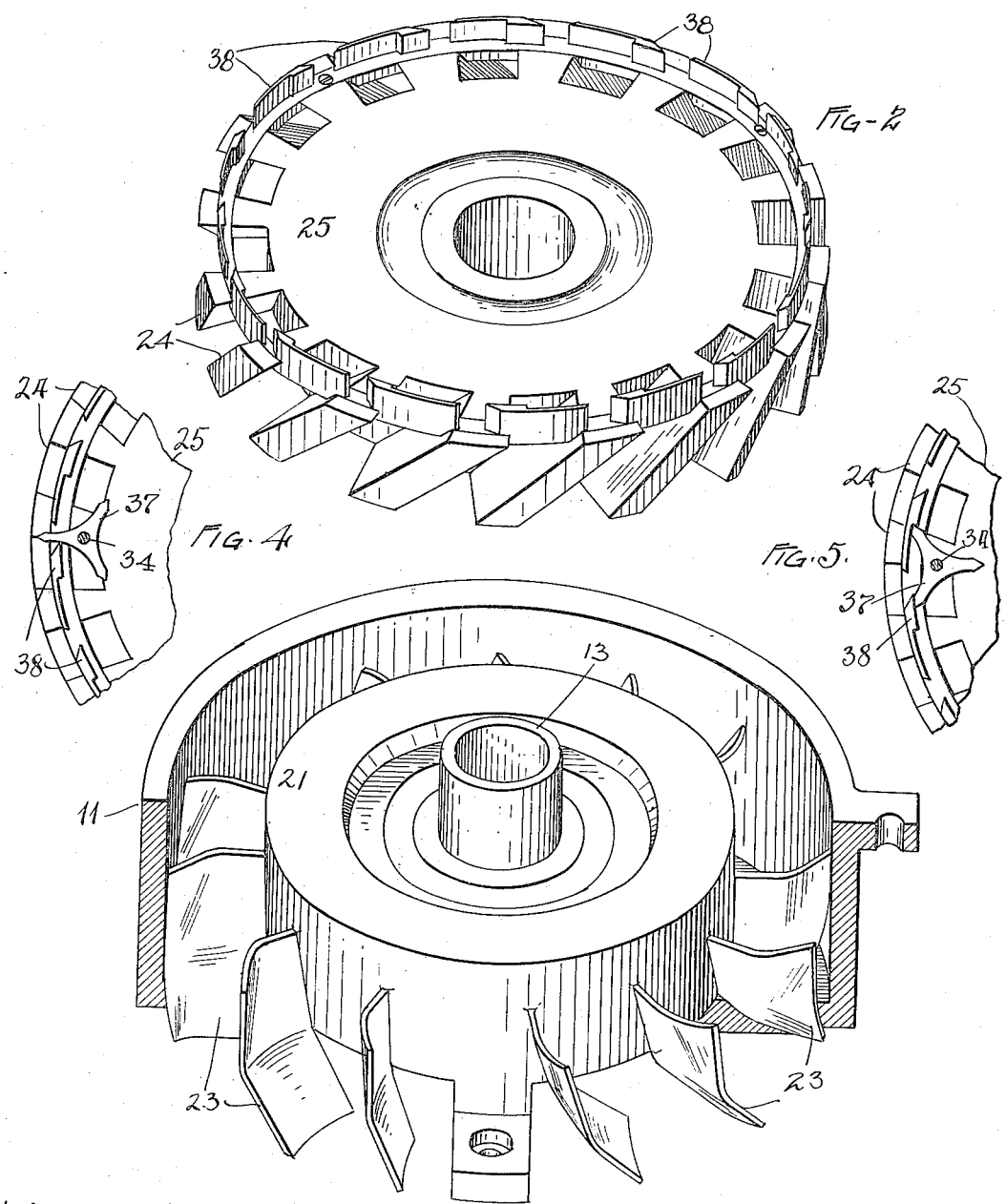

FREDERICK W. HANKS, OF CLEVELAND, OHIO.

WATER-METER.

1,209,700.

Specification of Letters Patent.

Patented Dec. 26, 1916.

Application filed March 16, 1915. Serial No. 14,812.

*To all whom it may concern:*

Be it known that I, FREDERICK W. HANKS, a citizen of the United States, and a resident of Cleveland, county of Cuyahoga, and State of Ohio, have invented a new and useful Improvement in Water-Meters, of which the following is a specification, the principle of the invention being herein explained and the best mode in which I have contemplated applying that principle, so as to distinguish it from other inventions.

The present improved water meter is of the type known in general as a compound meter, that is one that combines a high duty measuring device for registering the flow of strong currents with a low duty measuring device for measuring the flow of smaller currents. In meters of this type, as heretofore constructed, the small, or low capacity, meter is merely one arranged to pick up a small stream, with no assurance as to continuous operation nor that the point at which the control valve seats is sufficiently within the range of accuracy of the large meter to secure anything like satisfactory results. Furthermore, so far as I am aware, no positive means capable of differential action for actuating such control valve have heretofore been employed.

One of the principal objects of the present improved construction of meter, accordingly, is to direct a small stream through the low capacity meter where it will be accurately measured up to a point where the rate of flow is such that it will be accurately measured by the high duty meter, thus making of the primary meter an actual metering device on the service line, and not merely a leak-catching device of questionable character.

A further object is to provide means for positively operating the control valve which determines whether the high duty, or velocity meter shall be thrown in operation or not, without the use of counter-weights or double seats or other structural features which are likely to get out of order and render the operation of the valve uncertain.

To the accomplishment of the foregoing and related objects, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a vertical central section of a compound meter embodying my present improvements; Fig. 2 is a perspective view of a combined control valve and turbine wheel which forms a feature of such meter; Fig. 3 is a similar perspective view, with a part broken away, of the lower portion of the meter casing showing the stationary vanes for directing the flow of water against the vanes of such wheel; Fig. 4 is a plan view of a portion of the operating connection between such turbine wheel and the register; Fig. 5 is a similar view showing a slightly different position of the parts; Fig. 6 is a broken elevational view of another detail of such operative connection; and Fig. 7 is a plan view of the gear train between the low duty meter and the register.

The general form, dimensions and construction of the outer or main casing of the meter may vary considerably, depending upon the particular use to which the meter is to be put. As shown, such casing is separable in a horizontal plane, the upper portion 1 which carries the registering mechanism 2 being removable from the lower portion 3, upon loosening cap-screws 4. Such registering mechanism 2 is of typical construction and need not be described in detail. A separate chamber 5 is provided in such upper casing portion to receive this register, the latter being driven through a spindle 6 that is provided at its lower end with a clutch 7 adapted to engage with mechanism presently to be described, and having operative connection with both of the measuring devices proper, so that whichever one of the latter is being operated by the flow of water through the meter casing, the amount of such flow will be noted on the single register.

The main chamber in the meter casing is divided into upper and lower parts, or sub-chambers, by a transverse partition 10 formed by the bottom wall of an inner casing 11. The inlet connection for the meter is with the lower such chamber part through an opening 8, while the outlet is by way of an opening 9 leading from the upper chamber part.

The transverse partition 10 formed by the bottom wall of the inner casing 11, has a central opening 12 through which extends a tubular member 13, the latter being of smaller diameter than such opening so as to leave an annular space. The upper end of the latter communicates with the low duty measuring device 14 which is illustrated as a meter with a nutating piston 15 of familiar type, the casing of such meter being jointly supported by the member 13 and the inner casing 11 previously referred to. Said member is provided with a series of openings 16 in its lateral wall below the plane of the partition 10 and of ample enough size to afford free communication with the lower portion of the main chamber, such communication being controlled by a vertically reciprocable valve 17 mounted on said tube and fitting as a piston in the annular space left between the member and the wall of the opening 12 in the partition. This valve 17 has a series of openings 18 which register with aforesaid openings 16, when the valve is in its lower position, as shown in full lines in Fig. 1. In such position, accordingly, this piston valve permits communication between the chamber portion in question and the tubular member and thus with the low duty meter, at the same time closing the annular opening left in the partition. However, upon being raised into the position indicated in dotted outline in said figure, the openings 16 in the tubular member 13 will obviously be closed, and at the same time such annular space in the partition will be opened. When the valve is thus raised it also uncovers an opening 19 in the lower part of tubular member 13, this opening being separate from the series of openings 16 and of relatively reduced cross-section so as to allow of restricted communication between the interior of said member and the lower part of the main chamber in the meter. The upper portion 20 of the valve 17 is likewise fitted as a piston within a cylindrical pressure chamber 21 which is thereby completely closed save for a communicating duct shown in the form of a telescopic tube 22 that is conveniently disposed within the tubular member 13. The lateral wall of chamber 21, however, terminates short of the partition 10, or else is apertured about its lower edge, so that when the piston is thus raised, water may flow through the partition and thence upwardly through the annular passage left between such pressure chamber and the inner casing. A series of stationary diffusion vanes 23 is desirably placed in this annular chamber, as best shown in Fig. 3, said vanes being so disposed as to properly direct the upflowing water against the vanes 24 of a turbine wheel 25 rotatably mounted about the upper end of the tubular member 13 as an axis and having anti-friction bearings 26 and 27 interposed between it and the top of the pressure chamber 21 and the bottom of the low duty meter casing 14, respectively.

From the foregoing arrangement it will follow that whenever the valve member 17 is raised so as to permit flow from the lower part of the main chamber of the meter through the opening 12 in the partition 10, the low-duty meter will in effect be cut off from communication with such chamber part and the flow will solely actuate the turbine wheel 25 of the high velocity meter. Vice versa, when the valve 17 is seated so as to close the opening 12 in the partition 10, such high velocity meter is out of commission and the flow then directed through the tubular member 13 and the low-duty meter.

For communicating to the register 2 the motion of the nutating piston 15 of the low-duty meter, or that of the turbine wheel of the high velocity meter, the following means are provided:—A vertical spindle 30, conveniently alined with the spindle 6 is provided wherewith a pin 31 on said nutating valve engages, this spindle being connected through suitable intermediate gearing, including a slip clutch 32 (illustrated in Fig. 6) with a main driving gear 33 wherewith the clutch 7 on the lower end of said spindle 6 interlocks. To one side of the casing 14 of said low-duty meter is another vertical spindle 35 which is connected by a suitable train of gearing including a slip-clutch 36, similar to the one 32 illustrated in Fig. 6, with the same main driving gear 33 previously referred to. The lower end of the spindle 35, as illustrated in Figs 4 and 5, carries a star-wheel 37 adapted to engage a series of raised lugs 38 on the upper face of the turbine wheel 25 and constituting in effect a crown gear. These lugs, however, are constructed so that, save when one positively engages such star-wheel the latter is locked against rotation, this position being shown in Fig. 5, while in Fig. 4 the wheel is shown in the act of rotating by reason of engagement with the adjacent lug.

The foregoing driving connections between the two measuring devices, it will be obvious, permit the register to be actuated by either one of said devices, whichever happens to be in operation.

The general mode of operation of my improved meter should be readily understood from the foregoing description of its several parts and their individual operation. The water or other liquid to be measured, flowing into the lower part of the main chamber of the meter with the parts disposed as illustrated in full lines in Fig. 1, passes through the openings 18 and 16 into the tubular member 13, through the low-duty meter into the upper part of the main chamber of the meter, and thence to the outlet. Actuation of such low-duty meter will of course produce its proper effect on the register through the driving connections therebetween, and such flow will be entirely taken care of by the low-duty meter until the pressure rises to a point where a sufficient head is built up in the lower part of the chamber in the main casing to lift the piston valve 17 against the pressure in the pressure chamber 21, the pressure in the latter being normally reduced by the loss of head actually created in registering the smaller volume of liquid passing through the low-duty meter. This loss of head created by the small meter is communicated to such pressure chamber through the duct or tube 22, and may be controlled by increasing or decreasing the area of the passage through the small meter, and by adjusting the location of the point of communication of said duct with the main flow. It is to this end that the tube is made of telescopic construction so as to permit it to be set to secure the desired effect.

When the valve 17 has been raised, the openings 18 no longer register with the openings 16, so that the latter are closed and only the relatively small opening 19 serves to connect the lower chamber of the meter with the tubular member. This connection is sufficient to permit a change in the pressure in such chamber to be communicated to the pressure-chamber 21 and thus permit a restoration of the valve to its original position under a recurrence of the proper conditions. When raised, however, into the position indicated in dotted outline in Fig. 1, the flow of liquid is taken care of by the high duty measuring device, as previously explained, which is adapted to actuate the register through the appropriate train of gearing.

By way of illustration, the valve may be set to open at an approximate difference in pressure between the inlet and outlet sides of the meter of six pounds, and give sixty to seventy-five gallons per minute through the primary measuring device or low duty meter. When, however, the limit in pressure named is reached, the high duty measuring device is rendered operative and takes care of any flow capable of producing a difference in pressure greater than that noted. Since the large meter can be constructed so as to be accurate on a flow of one-third that mentioned as being taken care of by the low-duty meter before the high duty meter is rendered operative, there is practically no error involved in the operation of such high duty device. It will be observed that the loss of head upon which the opening of the valve depends is not created through the low-duty, or primary meter, but through the opening which supplies such primary meter. This is of importance and distinguishes the present meter from others of the compound type which depend on the loss of head through the primary meter itself for the operation of the controlling valve. In the present device the operation of the valve is entirely independent of any pressure condition created by the operation of the small meter, and depends only on the velocity or loss of head due to the area of the opening through which the flow takes place. The loss of head through the large meter, on the other hand, can of course be made anything desired by varying the size and disposition of the vanes on the turbine wheel.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a casing; a partition in said casing having an opening; a high-duty measuring device arranged to be operated by flow of fluid through such opening; a low-duty measuring device; a tubular member extending centrally through such opening and connected with said low-duty device; an annular valve reciprocably mounted upon said member and adapted to seat in such opening, said valve being adapted when thus seated to open said member to the flow of fluid and when raised to close the same; and a fluid-pressure actuated device adapted to raise said valve.

2. In mechanism of the character described, the combination of a casing; a partition in said casing having an opening; a high-duty measuring device arranged to be operated by flow of fluid through such opening; a low-duty measuring device; a tubular member extending centrally through such opening and connected with said low-duty device; an annular valve reciprocably mounted upon said member and adapted to seat in such opening, said valve being adapted when thus seated to open said member to the flow of fluid and when raised to close the same; and a fluid-pressure actuated device adapted to raise said valve, operation of said last-named device being dependent upon the loss of head created by said low-duty device.

3. In mechanism of the character described, the combination of a casing; a partition in said casing having an opening; a high-duty measuring device arranged to be operated by flow of fluid through such opening; a low-duty measuring device; a tubular member extending centrally through such opening and connected with said low-duty device; an annular valve reciprocably mounted upon said member and adapted to seat in such opening, said valve being adapted when thus seated to open said member to the flow of fluid and when raised to close the same; and an annular pressure-chamber surrounding said member, said chamber communicating with the interior of said member and a portion of said valve being fitted as a piston therein.

4. In mechanism of the character described, the combination of a casing having an inlet and an outlet opening; a partition in said casing located between such inlet and outlet openings and itself having an opening; a tubular member extending through the opening in said partition; a low-duty measuring device connected with said member on the outlet side of said partition; an annular valve reciprocably mounted upon said member and adapted to seat in such partition opening, said valve being adapted when thus seated to open said member to the flow of fluid and when raised to close the same; an annular pressure-chamber surrounding said member between said low-duty device and said partition, said chamber communicating with the interior of said member and a portion of said valve being fitted as a piston therein; and a turbine-wheel, constituting a high-duty measuring device, rotatably supported in the space between said chamber and the casing-wall.

5. In mechanism of the character described, the combination of a casing having an inlet and an outlet opening; a partition in said casing located between such inlet and outlet openings and itself having an opening; a tubular member extending through the opening in said partition; a low-duty measuring device connected with said member on the outlet side of said partition; an annular valve reciprocably mounted upon said member and adapted to seat in such partition opening, said valve being adapted when thus seated to open said member to the flow of fluid and when raised to close the same; an annular pressure-chamber surrounding said member between said low-duty device and said partition, said chamber communicating with the interior of said member and a portion of said valve being fitted as a piston therein; a turbine-wheel, constituting a high-duty measuring device, rotatably mounted upon said member between said chamber and low-duty device and extending into the space between said chamber and the casing-wall; and anti-friction bearings disposed between said wheel and said device and chamber, respectively.

6. In mechanism of the character described, the combination of a casing having an inlet and an outlet opening; a partition in said casing located between such inlet and outlet openings and itself having an opening; a tubular member extending through the opening in said partition; a low-duty measuring device connected with said member on the outlet side of said partition; an annular valve reciprocably mounted upon said member and adapted to seat in such partition opening, said valve being adapted when thus seated to open said member to the flow of fluid and when raised to close the same; an annular pressure-chamber surrounding said member between said low-duty device and said partition, a portion of said valve being fitted as a piston in said chamber; a duct connecting said chamber with the lower portion of said member; and a turbine-wheel constituting a high-duty measuring device, rotatably supported in the space between said chamber and the casing wall.

Signed by me, this 13th day of March, 1915.

FREDERICK W. HANKS.

Attested by—
A. L. GILL,
JNO. F. OBERLIN.